April 28, 1925.

A. M. SOUKUP 1,535,870

PROCESS MOLDING PRESS TO MAKE MOLDS IN WAX AND OTHER SUBSTANCES FOR THE USE OF ELECTROTYPERS AND OTHERS

Filed May 5, 1924    2 Sheets-Sheet 1

Inventor
Anthony M. Soukup

By Bryant & Lowry
Attorneys

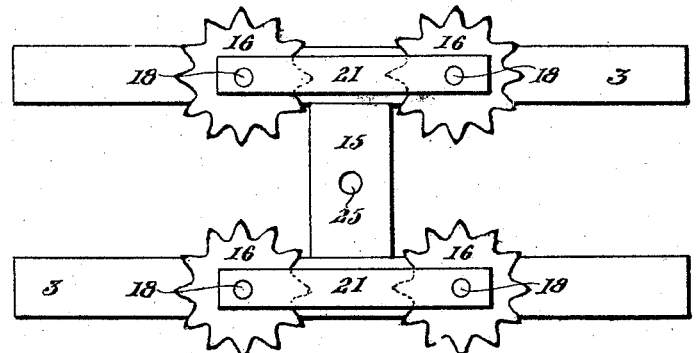
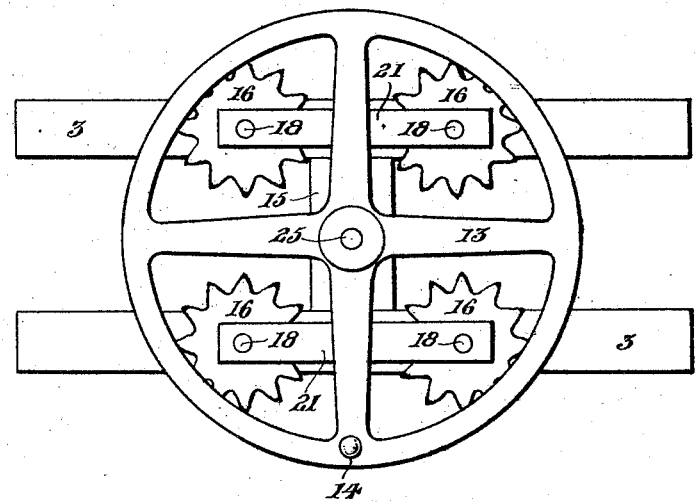
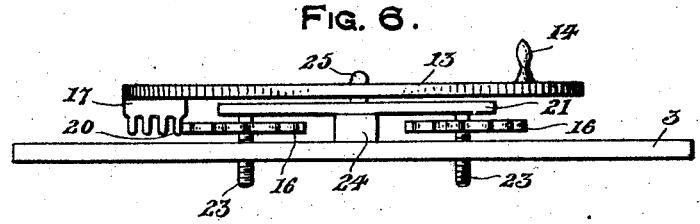

Patented Apr. 28, 1925.

1,535,870

UNITED STATES PATENT OFFICE.

ANTHONY M. SOUKUP, OF CHICAGO, ILLINOIS.

PROCESS MOLDING PRESS TO MAKE MOLDS IN WAX AND OTHER SUBSTANCES FOR THE USE OF ELECTROTYPERS AND OTHERS.

Application filed May 5, 1924. Serial No. 711,098.

*To all whom it may concern:*

Be it known that I, ANTHONY M. SOUKUP, a citizen of the United States, residing at Chicago, in the county of Cook and State of Illinois, have invented a New Process Molding Press to Make Molds in Wax and Other Substances for the Use of Electrotypers and Others.

The invention is a new molding press which is operated by a series of screws being consecutively turned either by hand by means of wheels or handles firmly attached to the heads of the screws, or by a specially devised gearing system. The use and consecutively turning of the screws diminishes the force necessary to make a mold and also produces a consecutively descending motion which expresses the intervening air between the composition or cuts to be molded and the layer of the molding substance and thus allows an easy displacement of a portion of the substance, effecting a molding with little force.

Figure 1:
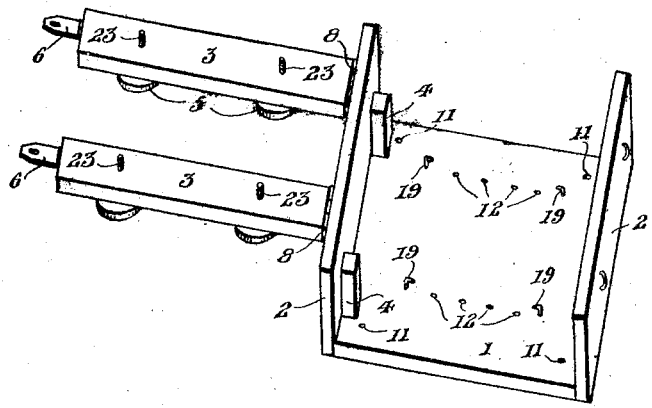
Figure 2:
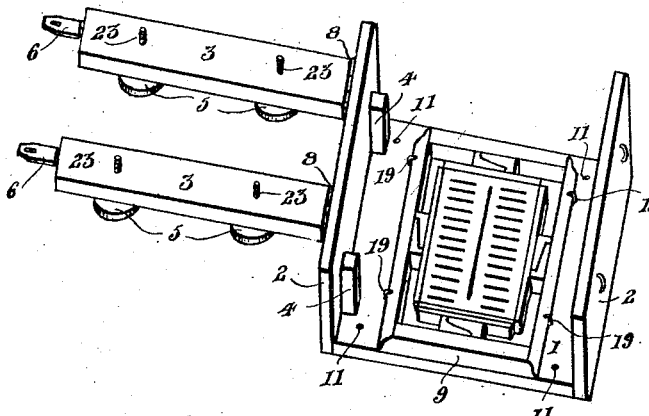
Figure 3:
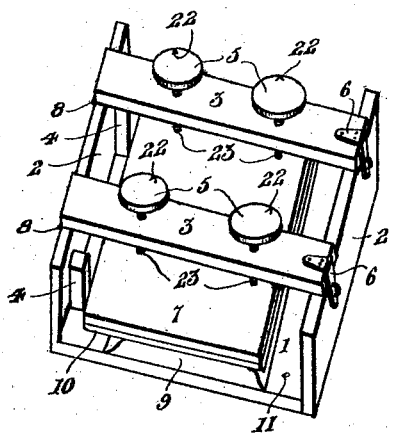

The accompanying two sheets of drawings illustrates the invention. Fig. 1 shows in perspective the press with the transverse arms, holding the screws, outstretched. Fig. 2 is the similar view showing in addition a form or chase with composition on its base or platform, the form or chase not being a part of the invention but only illustrates the use of the press in perspective. Fig. 3 shows the press with the transverse arms locked in position, the plate with the molding substance on the chase and a reenforcing plate on top of it also being shown, and Figures 4, 5 and 6 show in plan and elevation the specially devised gearing system for turning the screws.

Fig. 1 illustrates the press and its parts which includes the base or platform 1, the two sides 2, the transverse arms 3, the screws 23, and the wheels 5 for turning. The screws are inserted in threaded holes in the transverse arms. It also shows two rows of threaded holes 12 in the platform for the insertion of screw-hooks by means of which the chase or form or the molding plate, if it is placed under the chase, can be held to the base. The drawing shows four of such screw hooks 19 in position. The screw-hooks can be inserted in other holes according to the size of the form. The platform or base also shows four other holes 11 where the press can be screwed or nailed to a table, if it is so desired. The screwing of the chase is not always necessary. Sometimes, however, when the molding is done, the plate may adhere a little to the composition, and if the chase is held firmly by means of screw-hooks or by some other arrangement to the platform, it can be more easily separated. The numeral 4 designates two side supporting blocks which may be of any suitable size and also in any desired number, as may be required. Against these side supporting blocks the molding plate is set. They prevent its movement to either side and also, when the molding plate is done, help the operator to lift the mold straight up without swerving. The transverse arms 3 are attached to one side of the press by means of hinges 8. When the form or chase, the molding plate and reenforcing plate are in position, the free ends of the transverse arms are locked to the other side of the press by means of hinge-hasps 6. If desired the transverse arms may be held in position during the molding by other suitable means.

Fig. 2 is the same as Fig. 1, but it has the chase or form 9 in position and held by screw-hooks 19. Some may prefer to have the molding plate under the form, in which case the reenforcing plate 7, which is shown in Fig. 3, must be placed on top of the form, then lying with its face down on the molding substance.

Fig. 3 illustrates the press with the form 9, the molding plates 10 and reenforcing plate 7 in position and with the transverse arms 3 locked. The screw turning wheels 5 each have a mark 22 enabling the operator to know when he has made a complete revolution. The necessary force is more easily applied, if the screws have fine threads, say about four threads to an eighth of an inch. The screws may have fine or coarse threads, but that makes a difference. Fine threads make molding easier, but prolong it a little, while coarse threads on the screws make molding a little harder, but accomplishes it sooner. It is usually necessary to force the screws down by turning about one eighth to one fourth of an inch, or more or less, and the operator has to make a corresponding number of turns in order to make a mold. Before the actual molding begins, all the screws should touch lightly the upper surface of the plate. While molding is in progress, the screws are turned consecutively, first one, then the other, then the third and finally the fourth; that may be repeated several times. This causes a consecutively descending motion—first one side or one corner of the plate descends a little, then the other, then the third and finally the fourth; then it starts over again, until several revolutions of each screw have been made. When the operator is sure that molding has been accomplished he unlocks the transverse arms 3, raises their free ends and lifts the molding plate straight up being guided by the side support blocks 4. The reenforcing plate 7 is used only, when the molding substance is spread on a plate that might break or bend during molding, or when the chase or form comes on top of the molding plate. When the operator after molding is lifting the molding plate he should hold it firmly by its free edges where there is no mold.

If desired the turning of the screws can be effected by means of a specially devised gearing as shown by drawings on Sheet No 2, in Figures 4, 5 and 6. Here the plain screw-wheels are replaced by gear wheels 16.

In Fig. 4 the operating wheel is not in place so as to show the arrangement of the gear wheels more plainly. The lower threaded ends of the screws 23 are inserted in the threaded holes in the transverse arms 3. The upper ends of the screws above the wheels are not threaded and are inserted in holes 18 in the upper supports 21, which in their middle are fastened to support blocks 24, as seen in Fig. 6. In the middle of the support 15 is mounted an axle 25, on which the operating wheel 13 rests and revolves. Fig. 5 is the same as Fig. 4, only it has the operating wheel 13 in place. This operating wheel 13 has a handle 14 for easy turning. It has only a partial gear on one fourth of its circumference. While it is being rotated it always turns only one gear wheel 16. Thus it causes the same consecutive descending motion, as when the plain screw-wheels illustrated on Sheet No. 1 are turned consecutively by hand. Fig. 6 gives a side view of the special gearing system. It shows a transverse arm 3, the middle support block 24, to which is fastened the upper transverse support 21 holding in holes the upper ends of the screws 23 where they revolve. The operating wheel 13 is shown in position on its axle 25, with its handle 14 and with a part of the partial gear 17. Two gear wheels 16 are shown in position, and on the outer side of the last tooth of the partial gear 17 are shown fine lines 20 which serve as a gauge for together with the surfaces of the gear wheels they show how high or how low the screws have been turned. Similar lines are also on the outer side of the front tooth of the partial gearing and serve the same purpose. Turning of the gear wheels is easily done by the hand only by means of the operating wheel; but if desired the operating wheel can be turned by a motor.

This new process molding press can be made in several sizes according to the needs of the shop. It can be made of wood or of metal, or partly of wood and partly of metal. The number of screws can also be increased, and they can be arranged on two or more transverse arms or on a table either in a circle or in a polygon or otherwise.

In order to show the importance of my invention or discovery it may be well to add the following. At present molds are made by means of hydraulic presses often exerting a pressure of several tons to a square inch. This enormous pressure is necessary to overcome pockets of compressed air which are caught as the two platens come together equally on all sides. These presses cost thousands of dollars. In my new process molding press only little force is necessary to make a mold, and besides, my presses can be manufactured at a low cost.

In conclusion it may yet be added that when all the parts are in position, it takes only a few turns of the operating wheel to make a mold, and that may take only a few seconds. And again, when the molding is done and the mold removed from the press, only a few reverse turns of the operating wheel are necessary to bring the screws back to their original position and thus prepare them for a new molding.

I claim:

1. In a device of the type described, a base, opposed sides carried thereby, a plurality of parallel arms hingedly connected to the upper edge of one of said sides and resting, while in use, upon the upper edge of the other side, a feed screw threaded in each end portion of each arm, a gear fixed to each screw, and mechanical means operable to successively engage said gears for sequentially advancing said screws.

2. In a device of the type described, a base, opposed sides carried thereby, a plurality of parallel arms hingedly connected to the upper edge of one of said sides and resting, while in use, upon the upper edge of the other side, a feed screw threaded in each end portion of each arm, a gear fixed to each screw, an operating wheel rotatably supported by said arms, and means carried by said wheel for successively engaging said gears when the wheel is rotated for sequentially advancing said screws.

3. In a device of the type described, a base, opposed sides carried thereby, a plurality of parallel arms hingedly connected to the upper edge of one of said sides and resting, while in use, upon the upper edge of the other side, a feed screw threaded in each end portion of each arm, a gear fixed to each screw, an operating wheel rotatably supported by said arms, and a partial gear carried by said wheel for successively engaging said gears when the wheel is rotated for sequentially advancing said screws.

4. In a device of the type described, a base, opposed sides carried thereby, a plurality of parallel arms hingedly connected to the upper edge of one of said sides and resting, while in use, upon the upper edge of the other side, a feed screw threaded in each end portion of each arm, a gear fixed to each screw, an operating wheel rotatably supported by said arms, means carried by said wheel for successively engaging said gears when the wheel is rotated for sequentially advancing said screws, and means for manually rotating said operating wheel.

5. In a device of the type described, a frame structure having a hinged top, a plurality of feed screws threaded in the top, a gear fixed to each screw, and mechanical means operable to successively engage said gears for sequentially advancing said screws.

6. In a device of the type described, a frame having a hinged top, a plurality of feed screws threaded in the top, a gear fixed to each screw, an operating wheel rotatably supported by said hinged top, means carried by said wheel for successively engaging said gears when the wheel is rotated for sequentially advancing said screws, and means for manually rotating said operating wheel.

7. In a device of the type described, a frame structure including a top, a plurality of feed screws threaded in the top, and mechanical means operable to sequentially advance said screws.

8. In a device of the type described, a frame structure including a displaceable section, a plurality of feed screws operatively carried by the displaceable section, and mechanical means associated with said feed screws and operable to sequentially advance the same.

Dr. ANTHONY M. SOUKUP.